(12) United States Patent
Liu et al.

(10) Patent No.: US 9,604,146 B2
(45) Date of Patent: Mar. 28, 2017

(54) APPARATUS AND METHOD TO PLAY A MULTIPLAYER, ONLINE GAME

(75) Inventors: Lei Liu, Tucson, AZ (US); Gregory L. Sylvester, II, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1616 days.

(21) Appl. No.: 11/328,490

(22) Filed: Jan. 6, 2006

(65) Prior Publication Data

US 2007/0167234 A1    Jul. 19, 2007

(51) Int. Cl.
| A63F 13/34 | (2014.01) |
| A63F 13/77 | (2014.01) |
| A63F 13/335 | (2014.01) |
| A63F 13/73 | (2014.01) |
| A63F 13/79 | (2014.01) |
| A63F 13/30 | (2014.01) |

(52) U.S. Cl.
CPC ............. *A63F 13/77* (2014.09); *A63F 13/12* (2013.01); *A63F 13/335* (2014.09); *A63F 13/73* (2014.09); *A63F 13/79* (2014.09); *A63F 2300/403* (2013.01); *A63F 2300/50* (2013.01); *A63F 2300/552* (2013.01)

(58) Field of Classification Search
CPC ................ A63F 13/12; A63F 2300/552; A63F 2300/50; A63F 2300/403
USPC ........ 463/40–42, 29; 713/169, 170, 175, 176
See application file for complete search history.

(56) References Cited

U.S. PATENT DOCUMENTS

| 5,618,045 A | 4/1997 | Kagan et al. |
| 6,383,075 B1 | 5/2002 | Jeong et al. |
| 6,524,189 B1 * | 2/2003 | Rautila ..................... 463/40 |

(Continued)

FOREIGN PATENT DOCUMENTS

| EP | 1346755 | 9/2003 |
| JP | 2002210248 | 7/2002 |

(Continued)

OTHER PUBLICATIONS

GauthierDickey, "A Distributed Architecture for Massively Multiplayer Online Games", 2004 http://ilab.cs.byu.edu/zappala/pubs/distributed-games-draft04.pdf.*

(Continued)

*Primary Examiner* — David L Lewis
*Assistant Examiner* — Ross Williams
(74) *Attorney, Agent, or Firm* — Yakov Sidorin; Quarles & Brady LLP

(57) ABSTRACT

A method is disclosed to play a multiplayer online game. The method provides a handset and a multiplayer game stored on a server, where that server comprises (N) user profiles including the (i)th user profile comprising the (i)th game status and the (i)th digital signature assigned to the (i)th user, wherein the (i)th user is one of the (N) users. The method establishes a communication link between the handset and the server, such that the (i)th user can play the multiplayer game, using the handset and the (i)th game status, with one or more other users in communication with the server. The method downloads to the handset the game software and the (i)th user profile comprising the (i)th game status and the (i)th digital signature, before discontinuing the communication link between the handset and the server.

6 Claims, 6 Drawing Sheets

(56) References Cited

U.S. PATENT DOCUMENTS

| | | |
|---|---|---|
| 6,884,172 B1 | 4/2005 | Lloyd et al. |
| 6,908,389 B1 | 6/2005 | Puskala |
| 7,181,614 B1 | 2/2007 | Gehrmann et al. |
| 2002/0061743 A1* | 5/2002 | Hutcheson et al. ......... 455/426 |
| 2002/0068629 A1 | 6/2002 | Allen et al. |
| 2002/0133707 A1 | 9/2002 | Newcombe |
| 2002/0147044 A1 | 10/2002 | Jakobsson et al. |
| 2004/0087373 A1 | 5/2004 | Choi |
| 2004/0139159 A1* | 7/2004 | Ricciardi et al. ............ 709/205 |
| 2004/0235568 A1* | 11/2004 | Kim ............................... 463/42 |
| 2006/0172799 A1* | 8/2006 | Kane et al. .................... 463/25 |

FOREIGN PATENT DOCUMENTS

| | | |
|---|---|---|
| JP | 2002210251 | 7/2002 |
| JP | 2003513513 | 4/2003 |
| JP | 2003316737 | 11/2003 |
| JP | 20050463365 | 2/2005 |
| JP | 2005100419 | 4/2005 |
| JP | 2005520265 A | 7/2005 |
| JP | 2005524920 A | 8/2005 |
| JP | 2005296660 A | 10/2005 |
| WO | WO0131836 | 5/2001 |
| WO | 03081447 | 10/2003 |
| WO | WO03100651 A1 | 12/2003 |
| WO | 2005026870 | 3/2005 |
| WO | WO2005028052 | 3/2005 |
| WO | WO2005039715 | 5/2005 |

OTHER PUBLICATIONS

Gautheirdickey, "A Distributed Architecture for Massively Multiplayer Online Games," [on-line], Oct. 8, 2005, distributed-games, Liverpool John Moores University.

* cited by examiner

APPARATUS AND METHOD TO PLAY A MULTIPLAYER, ONLINE GAME

FIELD OF THE INVENTION

Applicants' invention comprises an apparatus and method to play a multiplayer online game.

BACKGROUND OF THE INVENTION

There are two categories of multiplayer, online games. A first category utilizes desktop personal computers in communication with powerful game servers using the Internet. This category presently occupies the majority of the market because these online games provide abundant visual and audio user experiences. In addition, user profiles are updated when users leave the game space such that the users can continue their virtual experience at the same point in the multiplayer game when they reenter the game space.

The second category utilizes portable game devices interconnected using an ad hoc network. As a general matter, such portable game devices comprise less complex user interfaces. In addition, such portable devices allow only non-continuous game playing because the user profiles are not updated when the users leave the game space.

What is needed is an apparatus and method that allows portable, i.e. handheld, devices to communicate with a game server, and thereby, play powerful, server-based, multiplayer games, and to save a user profile to that portable device for use during a subsequent multiplayer session wherein the portable device is in communication via an ad hoc network with one or more other handheld devices, but not in communication with the game server.

SUMMARY OF THE INVENTION

Applicants' invention comprises a method to play an multiplayer online game. The method provides a handset and a multiplayer game stored on a server, where that server comprises (N) user profiles including the (i)th user profile comprising the (i)th game status and the (i)th digital signature assigned to the (i)th user, wherein the (i)th user is one of the (N) users.

The method establishes a communication link between the handset and the server, such that the (i)th user can play the multiplayer game, using the handset and the (i)th game status, with one or more other users in communication with the server. The method then downloads to the handset the game software and the (i)th user profile comprising the (i)th game status and the (i)th digital signature, before discontinuing the communication link between the handset and the server, so that in a later time, the (i)th user is able to continue playing with other users with handheld devices with the same game software downloaded, in an ad hoc network without communication link to the game server. Meanwhile, the (i)th game status will be updated in the (i)th user's handset during game playing in the ad hoc network. Moreover, these updates in the (i)th game status will be uploaded to the game server when the next time the (i)th user's handset has a communication link with the game server.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Figure 1:
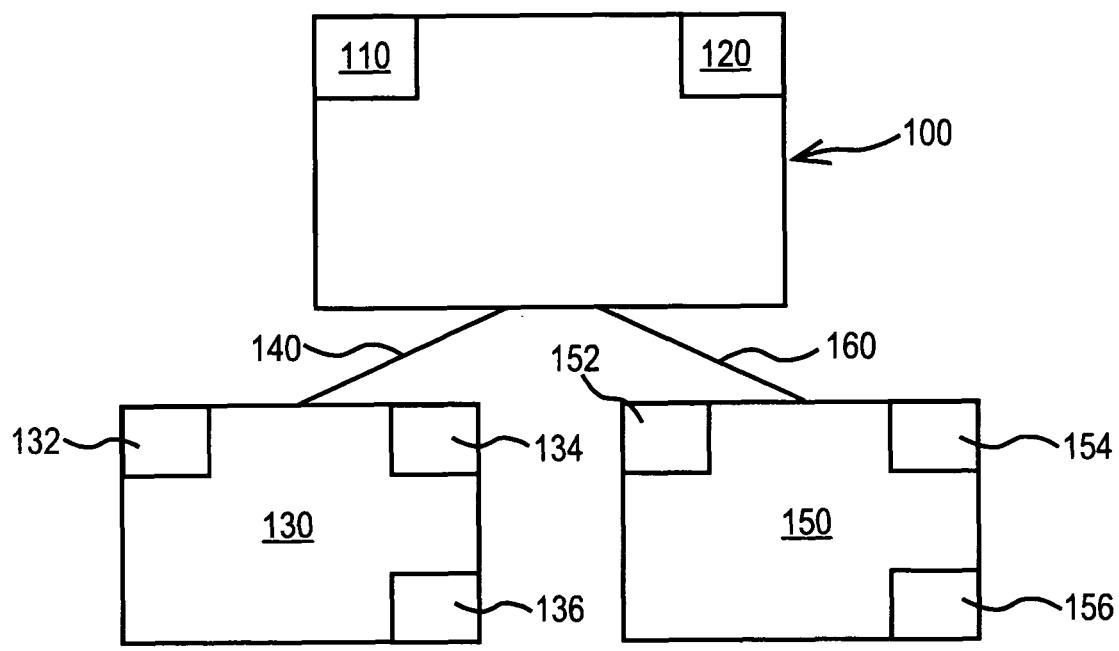
FIG. 1 is a block diagram showing a game server in communication with two game handsets.

This invention is described in preferred embodiments in the following description with reference to the Figures, in which like numbers represent the same or similar elements. Referring now to FIG. 1, server 100 comprises a multiplayer game 110 and (N) user profiles 120. Server 100 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

As a general matter, in order to play multiplayer game 110 two or more users must be in communication with server 100. In the illustrated embodiment of FIG. 1, a first handheld device 130 is in communication with server 100 via a first communication link 140, and a second handheld device 150 is in communication with server 100 via communication link 150. Handheld device 130 may be, but need not be, identical to handheld device 150.

Handheld device 130 comprises a processor 132, instructions 134, and memory 136. Instructions 134 are by processor 132 to operate device 130.

In certain embodiments, memory 136 comprises non-volatile memory, such as for example one or more EEPROMs (Electrically Erasable Programmable Read Only Memory), one or more flash PROMs (Programmable Read Only Memory), battery backup RAM, hard disk drive, one or more optical storage media (CD, DVD, and the like), combinations thereof, and the like.

In certain embodiments, handheld device 130 further comprises a visual display device, built-in stereo speakers, one or more input/output ports/devices, a disk drive, a built-in battery, and terminals for charging said built-in battery. In certain embodiments, the visual display device comprises a 4.3 inch, 16:9 widescreen TFT LCD, 480×272 pixel (16.77 million colors), Max. 200 cd/m² (with brightness control). In certain embodiments, the built-in battery comprises a built-in lithium-ion battery. In certain embodiments, the one or more input/output ports/devices comprise IEEE 802.11b (Wi-Fi) capability, one or more USB 2.0 ports, one or more Memory Stick™ PRO Duo, one or more IRDA devices/ports, and one or more IR Remote (SIRCS) devices.

In certain embodiments, handheld device 130 further comprises a plurality of keys and/or switches comprising directional buttons (Up/Down/Right/Left) analog pad, enter keys (triangle, circle, cross, square), left, right keys, START, SELECT, HOME, POWER On/Hold/Off switch, brightness control, sound mode, volume adjustment, wireless LAN on/off switch, and disk eject.

In certain embodiments, communication link 140 is selected from the group consisting of a Local Area Network (LAN), a private Wide Area Network (WAN), a public wide area network, Transmission Control Protocol/Internet Protocol (TCP/IP), the Internet, and combinations thereof.

Handheld device 150 comprises a processor 152, instructions 154, and memory 156. Instructions 154 are used by processor 152 to operate device 150.

In certain embodiments, memory 156 comprises non-volatile memory, such as for example one or more EEPROMs (Electrically Erasable Programmable Read Only Memory), one or more flash PROMs (Programmable Read Only Memory), battery backup RAM, hard disk drive, one or more optical storage media (CD, DVD, and the like), combinations thereof, and the like.

In certain embodiments, handheld device 150 further comprises a visual display device, built-in stereo speakers, one or more input/output ports/devices, a disk drive, a built-in battery, and terminals for charging said built-in battery. In certain embodiments, the visual display device comprises a 4.3 inch, 16:9 widescreen TFT LCD, 480×272 pixel (16.77 million colors), Max. 200 cd/m$^2$ (with brightness control). In certain embodiments, the built-in battery comprises a built-in lithium-ion battery. In certain embodiments, the one or more input/output ports/devices comprise IEEE 802.11b (Wi-Fi) capability, one or more USB 2.0 ports, one or more Memory Stick™ PRO Duo, one or more IrDA devices/ports, and one or more IR Remote (SIRCS) devices.

In certain embodiments, handheld device 150 further comprises a plurality of keys and/or switches comprising directional buttons (Up/Down/Right/Left) analog pad, enter keys (triangle, circle, cross, square), left, right keys, START, SELECT, HOME, POWER On/Hold/Off switch, brightness control, sound mode, volume adjustment, wireless LAN on/off switch, and disk eject.

In certain embodiments, communication link 160 is selected from the group consisting of a Local Area Network (LAN), a private Wide Area Network (WAN), a public wide area network, Transmission Control Protocol/Internet Protocol (TCP/IP), the Internet, and combinations thereof.

Figure 2:
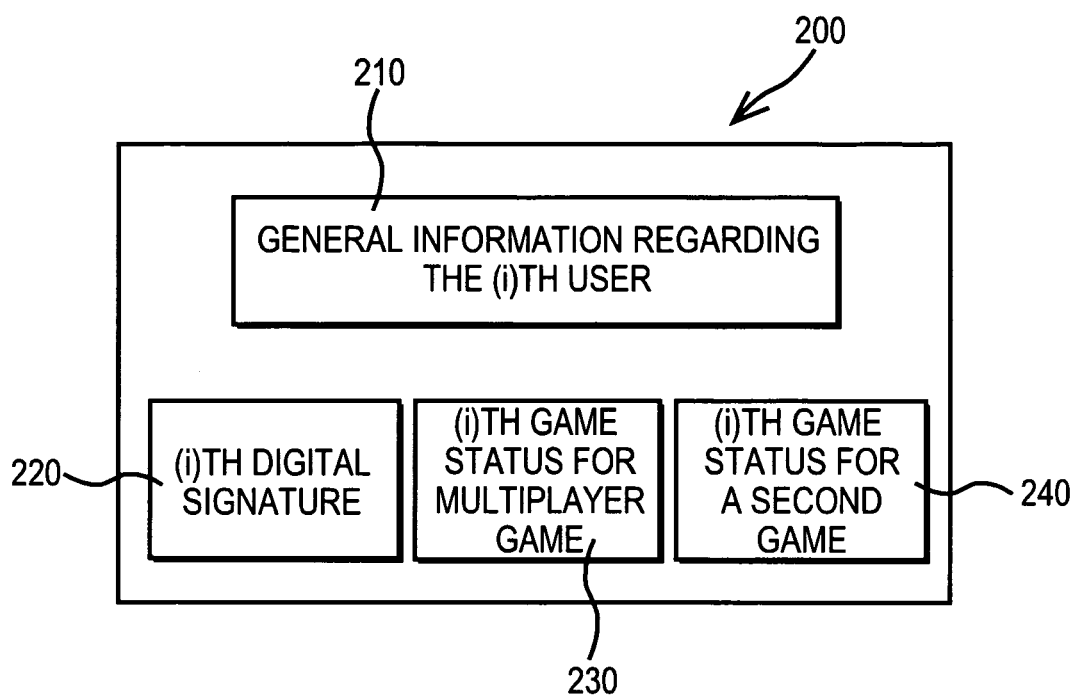
FIG. 2 is a block diagram illustrating the (i)th user profile saved on the game server.

Plurality of user profiles 120 comprises (N) individual user profiles associated with (N) individual users. Referring now to FIG. 2, the (i)th user profile 200 comprises general information 210 pertaining to the (i)th user, wherein that (i)th user is one of the (N) users. This general information comprises, for example, the legal name of the (i)th user, one or more fictitious names used by the (i)th user in the game space, the amount of money the (i)th user has on deposit, how many times the (i)th user has played one or more games available on server 100, and the like.

In addition, (i)th user profile 200 further comprises the (i)th digital signature 220, and specific game-related information. In the illustrated embodiment of FIG. 2, the (i)th user profile 200 further comprises the (i)th game status 230 for multiplayer game 110 (FIG. 1). The (i)th user profile 200 may optionally comprise a game status for each of a plurality of additional online games.

In certain embodiments, the (i)th digital signature 220 is assigned by server 100. In other embodiments, the (i)th digital signature 220 is established by the manufacturer of the handheld device, such as device 130 (FIG. 1), used by the (i)th user to connect with, and play games stored on, server 100. In these embodiments, the (i)th digital signature 220 is uploaded from the handheld device to server 100.

Using prior art methods, the (i)th user can participate in multiplayer game 110 only when that (i)th user is in communication with server 100. As an example, if the (i)th user is participating in multiplayer game 110 using handheld device 130 and communication link 140, once communication link 140 is discontinued, the (i)th user cannot again participate in multiplayer game 110 until a communication link with server 100 is reestablished.

Figure 4:
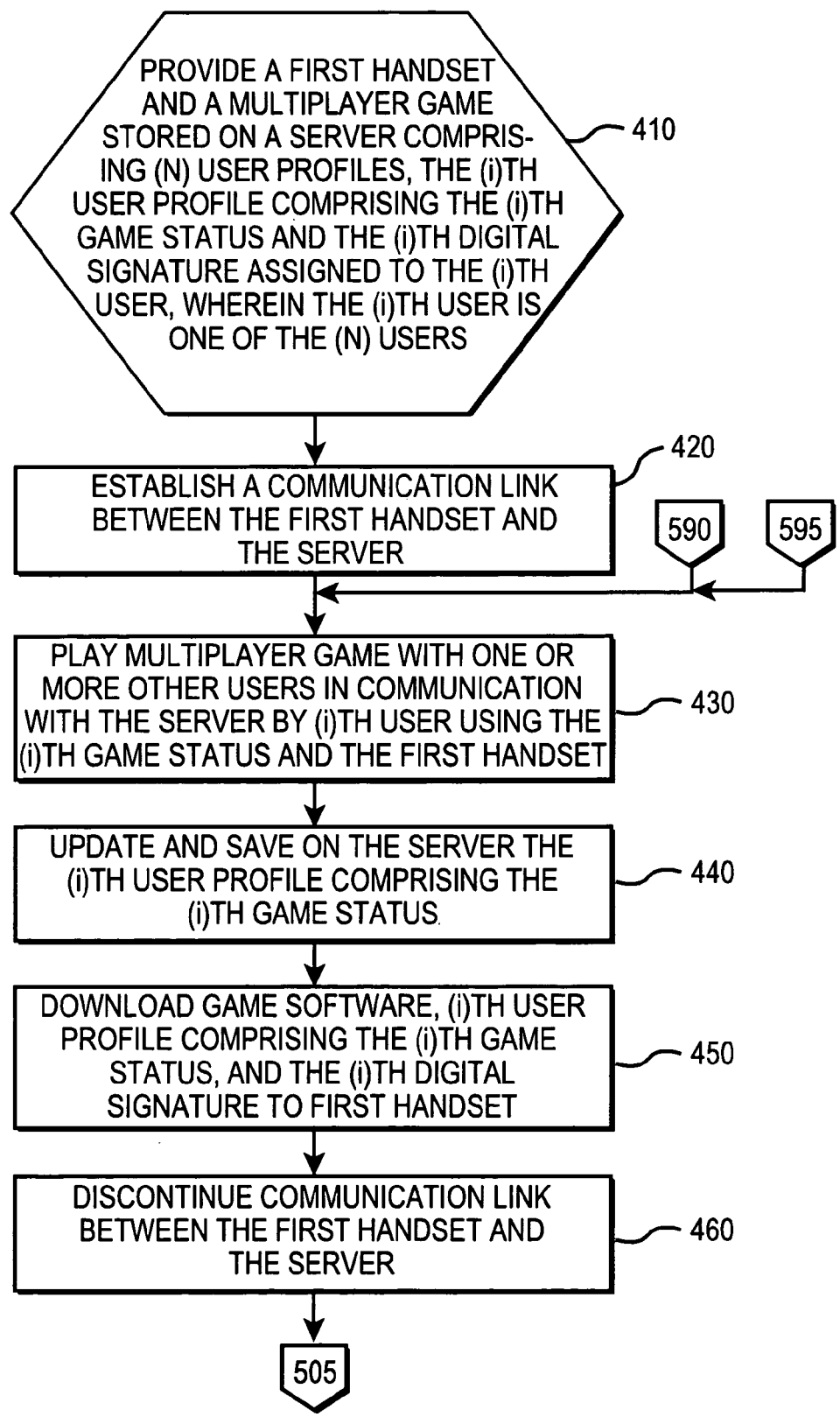
FIG. 4 is a flow chart summarizing certain steps of Applicants' method.
Figure 5:
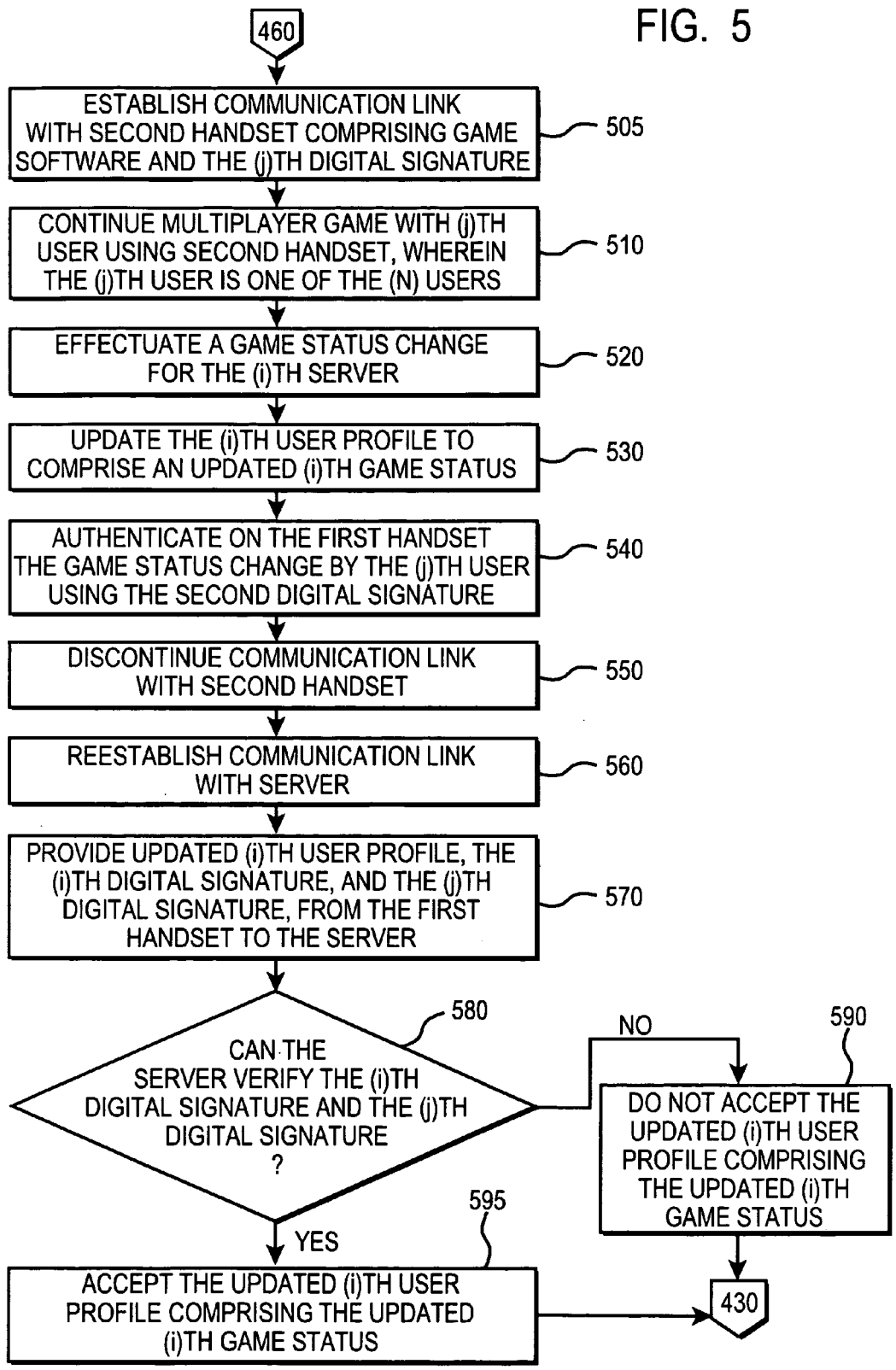
FIG. 5 is a flow chart summarizing additional steps of Applicants' method.

Using Applicants' method, however, the (i)th user can continue to participate in multiplayer game 110 even when that user's handheld device is not in communication with server 100. FIGS. 4 and 5 summarize the steps of Applicants' method.

Referring now to FIG. 4, in step 410 Applicants' method provides a multiplayer game, such as multiplayer game 110 (FIG. 1), stored on a server, such as server 100 (FIG. 1), where that server comprises (N) user profiles including the (i)th user profile, such as (i)th user profile 200, comprising the (i)th digital signature and the (i)th game status, wherein the (i)th user is one of the (N) users. Step 410 further comprises providing a first handset, such as for example handset 130, wherein the (i)th user communicates with the game server using that first handset.

In step 420, Applicants' method provides a first communication link, such as communication link 140, between the first handset of step 410 and the server of step 410. In step 430, the (i)th user participates in the multiplayer game of step 410 along with one or more other users in communication with the server. The one or more other users each utilize a handset, wherein for example the (j)th user uses the (j)th handset, and wherein the (j)th handset need not be identical to the first handset utilized by the (i)th user.

In step 440, as the multiplayer game proceeds the (i)th user profile comprising the (i)th user game status is updated to reflect an (i)th game status change each time the (i)th user achieves a certain result in the multiplayer game, such as for example locating a secret place, killing an opponent, being killed by an opponent, and the like. The updated (i)th user game status of step 440 is saved in the (i)th user profile, such as the (i)th user profile 200 (FIG. 2), stored on the game server, such as server 100.

In step 450, Applicants' method at a first time downloads to the first handset game software comprising all or a portion of the multiplayer game of step 410, the (i)th user profile comprising the (i)th game status, and the (i)th digital signature. In step 460, the method at a second time subsequent to the first time of step 450 discontinues the communication link between the first handset and the server.

Applicants' method transitions from step 460 to step 505 (FIG. 5) wherein at a third time subsequent to the second time of step 460 establishes a second communication link with a second handset comprising the game software and a second digital signature. In the illustrated embodiment of FIG. 3A, first handset 130 is in direct communication with second handset 330 via communication link 320.

In certain embodiments, communication link 320 comprises a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, communication link 320 is compliant with one or more of the embodiments of IEEE Specification 802.11 (collectively the "IEEE Specification"). As those skilled in the art will appreciate, the IEEE Specification comprises a family of specifications developed by the IEEE for wireless LAN technology.

The IEEE Specification specifies an over-the-air interface between a wireless client, such as for example projector 100, and a base station or between two wireless clients. The IEEE accepted the IEEE Specification in 1997. There are several specifications in the 802.11 family, including (i) specification 802.11 which applies to wireless LANs and provides 1 or 2 Mbps transmission in the 2.4 GHz band using either frequency hopping spread spectrum (FHSS) or direct sequence spread spectrum (DSSS); (ii) specification 802.11a which comprises an extension to 802.11 that applies to wireless LANs and provides up to 54 Mbps in the 5 GHz band using an orthogonal frequency division multiplexing encoding scheme rather than FHSS or DSSS; (iii) specification 802.11b, sometimes referred to as 802.11 High Rate or Wi-Fi, which comprises an extension to 802.11 that applies to wireless LANS and provides up to about 11 Mbps transmission in the 2.4 GHz band; and/or (iv) specification 802.11g which applies to wireless LANs and provides 20+ Mbps in the 2.4 GHz band.

Figure 3A:
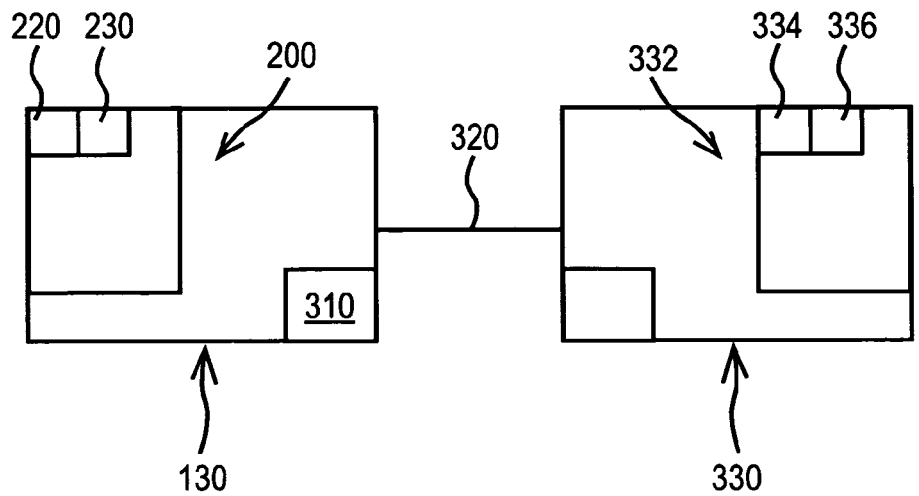
FIG. 3A shows a first handset in direct communication with a second handset using a first ad hoc network.
Figure 3B:
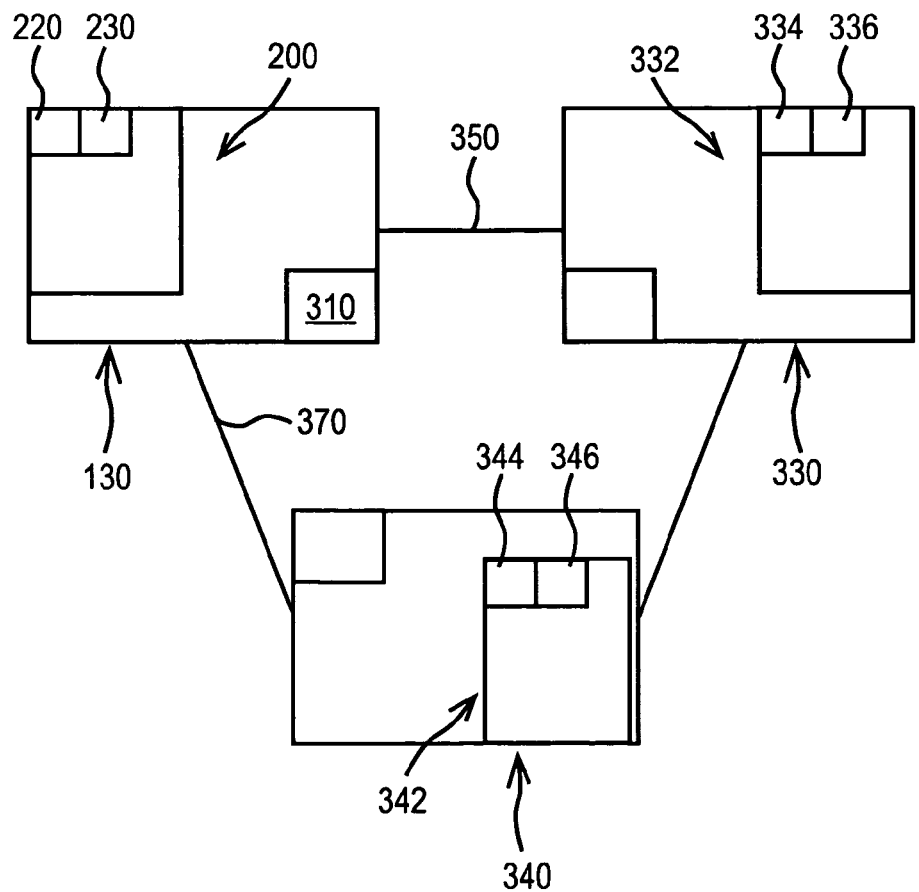
FIG. 3B shows a first handset, a second handset, and a third handset, in communication using a second ad hoc network.

First handset 130 comprises game software 310, and the (i)th user profile 200 (FIG. 2) which comprises the (i)th digital signature 220 (FIGS. 2, 3A, 3B) and the (i)th game status 230 (FIG. 2, 3A,3B). Second handset 330 comprises game software 310 and the (j)th user profile 332 which comprises the (j)th digital signature 334 and the (j)th game status 336, wherein the (i)th user and the (j)th user are each different ones of the (N) users of step 410 (FIG. 4).

In the illustrated embodiment of FIG. 3B, first handset 130 is in direct communication with second handset 330 via communication link 350, second handset 330 is in direct communication with third handset 340 via communication link 360, and third handset 340 is in direct communication with first handset 130 via communication link 370. In certain embodiments, communication links 350, 360, and 370, are each independently selected from the group consisting of a wireless communication link, a serial interconnection, such as RS-232 or RS-422, an ethernet interconnection, a SCSI interconnection, an iSCSI interconnection, a Gigabit Ethernet interconnection, a Bluetooth interconnection, a Local Area Network (LAN), a private Wide Area Network (WAN), a public wide area network, Transmission Control Protocol/Internet Protocol (TCP/IP), combinations thereof, and the like. In certain embodiments, communication link 160 is compliant the IEEE Specification.

First handset 130 and second handset 330 are described above. Third handset 340 comprises game software 310 and the (k)th user profile 342 which comprises the (k)th digital signature 344 and the (k)th game status 346, wherein the (i)th user, the (j)th user, and the (k)th user, are each different ones of the (N) users of step 410 (FIG. 4).

Referring now to FIG. 5, in step 510 the (i)th user continues to play the multiplayer game with the (j)th user, and optionally one or more additional users such as the (k)th user, wherein the (i)th user utilizes the first handset 130, the (j)th user utilizes the second handset 330, and the optional (k)th user utilizes the third handset 340.

In step 520, the (i)th user effectuates a game status change. Such a game status change comprises, for example, finding a secret location, killing an opponent, being killed by an opponent, and the like.

Figure 6:
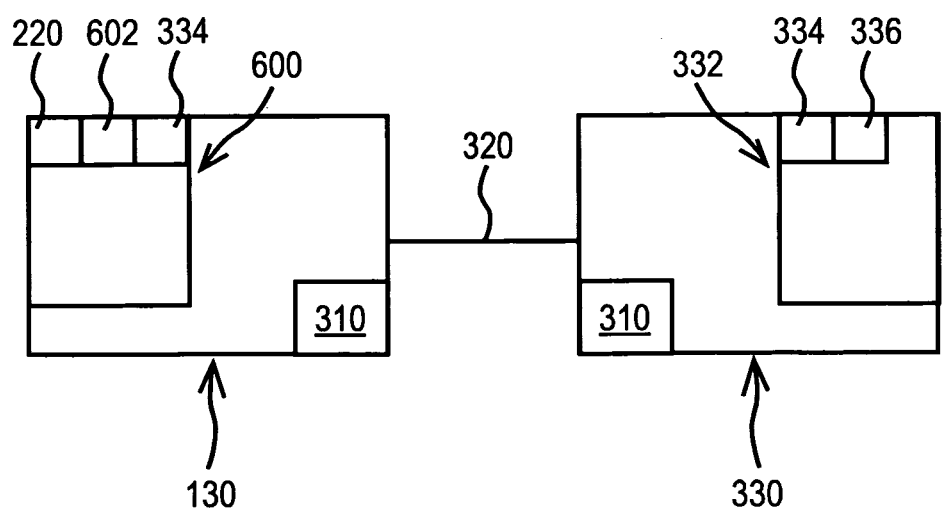
FIG. 6 is a block diagram showing the handsets and ad hoc network of FIG. 3A, wherein a first handset comprises an updated user profile which includes an updated game status.

In step 530, Applicants' method updates on the first handset the (i)th user profile to comprise an updated (i)th game status reflecting the game status change. For example and referring now to FIG. 6, in step 530 handset 130 now comprises an updated (i)th user profile 600 comprising an updated (i)th game status 602 reflecting the game status change.

In step 540, the (j)th user authenticates the updated (i)th user profile by placing the second digital signature 334 in the updated (i)th user profile 600. In embodiments, wherein (N) players, including the (i)th user, are playing the multiplayer game, then step 540 comprises authenticating the updated (i)th user profile by the (N-1) other users by placing (N-1) digital signatures in the updated (i)th user profile. In certain embodiments, steps 530 and 540 are performed synchronously. In certain embodiments, steps 520, 530, and 540, are performed synchronously.

In step 550, Applicants' method discontinues, at a fourth time subsequent to the third time of step 505, the communication link between the first handset and the one or more additional handsets. In step 560, Applicants' method reestablishes, at a fifth time subsequent to the fourth time of step 550, a third communication link with the game server, such as server 100 (FIG. 1). In certain embodiments, the third communication link of step 560 is identical to the first communication link of step 420. In other embodiments, the third communication link differs from the first communication link.

In step 570, Applicants' method provides the updated (i)th user profile, such as updated (i)th user profile 600 (FIG. 6) comprising the (i)th digital signature 220, the updated (i) game status 602, and (j)th digital signature 334, to the game server. In step 580, the game server determines if the (i)th digital signature and the (j)th digital signature can be verified.

If the game server cannot verify the (i)th digital signature and/or the (j)th digital signature in step 580, then the method transitions from step 580 to step 590 wherein the game server does not accept the updated (i)th user profile. Applicants' method transitions from step 590 to step 430 and continues as described herein.

Alternatively, if the game server does verify in step 580 the (i)th digital signature and the (j)th digital signature, then the method transitions from step 580 to step 595 wherein the game server saves the updated (i)th user profile, including the updated (i)th game status, as the (i)th user profile 200 (FIG. 2). Applicants' method transitions from step 595 to step 430 and continues as described herein.

In certain embodiments, individual steps recited in FIGS. 4 and/or 5, may be combined, eliminated, or reordered.

In certain embodiments, Applicant's invention includes instructions, such as instructions 134 (FIG. 1), where those instructions are executed by processor 132 (FIG. 1) to perform one or more of steps 420, 430, 440, 450, and/or 460, recited in FIG. 4, and/or steps one or more of steps 505, 510, 530, 550, 560, and/or 570, recited in FIG. 5.

In other embodiments, Applicant's invention includes instructions residing in any other computer program product, where those instructions are executed by a computer external to, or internal to, the first handset to perform one or more of steps 420, 430, 440, 450, and/or 460, recited in FIG. 4, and/or steps one or more of steps 505, 510, 530, 550, 560, and/or 570, recited in FIG. 5. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to play an multiplayer, online game, comprising:
    providing a server comprising a first user profile comprising a first user game status, a first user digital signature, a second user game status, and a second user digital signature;
    establishing a communication link between a first handset comprising said first user profile and a second handset;
    engaging in a multiplayer game by said first user and said second user;
    effectuating a game status change for the first user to indicate killing an opponent;
    saving an updated first user game status in an updated first user profile stored on said first handset to reflect said game status change;
    authenticating said updated first user game status by said second handset by placing said second user digital signature in said updated first user profile stored on said first handset;
    establishing a communication link between said first handset and said server;
    providing said updated first user game status to said server;
    if said server can verify said first digital signature and said second digital signature, accepting by said server said updated first user profile;
    if said server cannot verify said first digital signature and/or said second digital signature, not accepting by said server said updated first user profile.

2. The method of claim 1, wherein said establishing a second communication link and/or said establishing a first communication link step further comprises providing a wireless communication link.

3. A handset comprising a first user profile, a first user game status, a first user digital signature, and a non-transitory computer readable medium having computer readable program code disposed therein to play a multiplayer, online game stored on a server, the computer readable program code comprising a series of computer readable program steps to effect:
    establishing a first communication link with said handset and a second handset comprising a second user digital signature;
    saving an updated first user game status on said handset in an updated first user profile to indicate a game status change for said first user to indicate killing an opponent;
    authenticating said updated first user game status by said second handset by placing said second user digital signature in said updated first user profile stored on said handset;
    establishing a second communication link with said server;
    providing said updated first user game status to said server.

4. The handset of claim 3, wherein said second communication link comprises a wireless communication link.

5. A computer program product disposed in a non-transitory computer readable medium and usable with a programmable computer processor to play an multiplayer, online game stored on a server comprising a first user profile, a first user game status, a first user digital signature, a second user game status and a second user digital signature, comprising:
    computer readable program code which causes said programmable computer processor to establish a first communication link between a first handset and a second handset;
    computer readable program code which causes said programmable computer processor to save an updated first user game status in an updated first user profile to include a game status change for a first user to reflect killing an opponent;
    computer readable program code which causes said programmable computer processor to authenticate said updated first user game status by said second handset by placing said second user digital signature in said updated first user profile stored on said first handset;
    computer readable program code which causes said programmable computer processor to establish a second communication link between said first handset and said server;
    computer readable program code which causes said programmable computer processor to provide said updated first user game status to said server;
    computer readable program code which if said server can verify said first digital signature and said second digital signature, causes said programmable computer processor to accept by said server said updated first user profile;
    computer readable program code which if said server cannot verify said first digital signature and/or said second digital signature, causes said programmable computer processor to not accept by said server said updated first user profile.

6. The computer program product of claim 5, wherein said second communication link comprises a wireless communication link.

* * * * *